United States Patent Office 2,875,064
Patented Feb. 24, 1959

2,875,064
BAKING COMPOSITIONS AND METHODS

Elmer F. Glabe, Chicago, Ill., assignor to Bred-Ade Corporation, Oak Park, Ill., a corporation of Illinois No Drawing. Application July 12, 1954
Serial No. 442,890

6 Claims. (Cl. 99—91)

This invention relates to baking compositions and methods, and it is particularly concerned with improvements in the preparation of yeast-raised bake products. The invention provides improvements in the dough stage of the baking process and in the baked goods, and it concerns a highly effective synergistically acting combination of substances which furnishes these improvements.

In he invention, calcium peroxide, brewer's inactive yeast and a proteolytic enzyme are incorporated in the dough of a yeast-raised bake product, a new composition of these ingredients being provided for that purpose. Yeast-raised bake products to which the invention is applicable include white bread, rolls and buns; dark bread, such as rye, whole wheat and variations of the two; fruit and other flavor containing breads, such as raisin, butter, egg, and others; and sweet yeast-raised products such as coffee cakes, sweet rolls and similar baked goods.

Prior to the present invention, the several ingredients of the new composition had been used individually. Calcium peroxide had been used as an aid in making the dry feeling and easily machined bread dough, and to increase absorption of water, resulting in greater bread yield. It had been the practice to use as much as .01 to .1% by weight of the flour of calcium peroxide to achieve the desired results. However, quantities as small as .0005% of calcium peroxide have a detectable effect upon bread flavor and odor, producing a flatness which retards natural bread flavor.

Brewer's inactive dry yeast had been incorporated in the dough in amounts of 0.5 to 3% by weight of the flour, to increase softness of texture, to improve flavor and to provide some reduction in dough mixing time. The use of inactive yeast has not been wholly satisfactory because it has a tendency to produce open grain in the loaf and to detract from texture when the recommended amounts are used.

Proteolytic enzymes have also been used to provide improvements in baking. These enzymes suitable for baking applications have been the subject of numerous publications in which their derivation, concentration, acceleration and depression of the active factors have been described in detail. Fungal enzymes have been employed principally, the most common organism from which the enzymes have been derived being *Aspergillus oryzeae*. Recently, bacterial enzymes have also been developed, and the invention includes these proteolytic enzymes as well.

The enzyme compositions useful for baking purposes contain proteolytic and amylolytic factors. The invention is primarily concerned with the proteolytic factors which are responsible for a reduction in the mixing time required to bring the dough to a proper degree of mellowing, requisite for handling in commercial machinery and for producing good bread. The amylolytic factors prevent rapid retrogradation of gelatinized starch in the bread, which has been found to closely parallel the staling of bread. The enzyme compositions have been standardized on the proteolytic factor on Ayre Anderson units (Can. J. Res. 17C, 239–246, 1939, and J. Assoc. Off. Agr. Chem. 30, 659, 1947), and on the amylolytic factor on SKB units ("Cereal Laboratory Methods," Amer. Assoc. of Cer. Chem. 1941, 100).

The enzyme compositions have been employed in quantities providing as high as 100 to 300 Ayre Anderson units per 100 grams of flour in the dough. A reduced mixing time is achieved, believed to be accomplished by partially dissolving the wheat protein to increase the rate of absorption of water into the protein. Several disadvantages have been encountered in use of the enzymes, however, the resulting texture and grain having been found to be adversely affected at times and bread flavor being affected deleteriously in the normally recommended amounts.

It has now been discovered in accordance with the invention that a combination of calcium peroxide, brewer's inactive yeast and a proteolytic enzyme overcomes the difficulties previously encountered and provides improved dough mixing and superior bake products. Surprisingly, quantities of these materials in the combination which are much smaller than the aforementioned recommended levels of the individual materials, result in substantial improvements over the prior baking compositions and methods.

There is apparently a synergistic effect resulting from the use of the new combination. In particular, there appears to be some other action of the enzymes which is accelerated in the combination without unduly accentuating the protein dissolving action. However, the protein dissolving action appears to overshadow this different action if high quantities of proteolytic factor are employed. The foregoing represents one explanation of the mode of action when proceeding according to the invention, but it will be understood that the invention is not limited to theoretical considerations and that, whatever the mechanism of the process, greatly improved results are obtained.

Use of the new composition and method results in increased water absorption capacity of the dough, provides the desired dry feeling and easy machinability, reduces the mixing time, and avoids the deleterious effects previously encountered. The flavor, odor, texture and grain of the baked goods are very substantially improved over goods prepared without additives and over those prepared with the additives employed individually and in combinations of less than all of the ingredients of the invention.

There is provided by the invention a composition for incorporation in the dough of a yeast-raised bake product to improve baking results which includes the above-described calcium peroxide, brewer's inactive yeast and a proteolytic enzyme. The invention includes a new method for improving baking results which involves incorporating these additives in the dough of the bake product. A new and improved yeast-raised bake product dough containing the ingredients of the new composition is also provided.

The components of the new combination are preferably employed in the following relative proportions, which are also the amounts corresponding to 100 grams of flour in the dough:

| | | |
|---|---|---|
| Calcium peroxide | gram | .0005–.01 |
| Brewer's inactive yeast | do | .005–.05 |
| Proteolytic enzyme | | [1] 1–50 |

[1] A. A. units.

In most applications, the following relative proportions have proven to be optimum and are further preferred:

| | | |
|---|---|---|
| Calcium peroxide | gram | .001–.0015 |
| Brewer's inactive yeast | do | .01–.015 |
| Proteolytic enzyme | | [1] 4.5–7.5 |

[1] A. A. units.

The lower quantities in the latter ranges when used with 100 grams of flour are generally applicable, for example, to hard winter wheat flour, and the larger quantities are recommended for spring wheat flour. Larger quantities may be used to fit special conditions, although it is rarely necessary to use more than three times the larger quantities per 100 grams of flour.

In the new composition for incorporation in the dough, the above relative proportions obtain. In the new method, the ingredients may be incorporated individually or in combination in the dough ultimately to provide the ingredients in combination in the stated amounts relative to the amount of flour. The improved dough thus contains these ingredients in the indicated amounts.

The composition for incorporation in the dough is very desirably furnished in the form of a mixture of the specified active ingredients with a carrier and diluent, preferably flour or flour plus sodium chloride. A preferred complete composition as supplied to the user and suited for simple regulated addition to the dough, in measured reliable and effective quantities, is as follows:

|  | Percent |
|---|---|
| Calcium peroxide | 0.83 |
| Brewer's inactive dry yeast | 8.30 |
| Fungal enzyme [1] | 0.42 |
| Sodium chloride | 15.00 |
| Hard wheat short patent flour | 75.45 |
|  | 100.00 |

[1] 9350 A. A. units per gram.

This composition is adapted for application at the rate of 2–3 oz. per 100 pounds of flour, or .12–.18% by weight. At times, it is advantageous to add a larger quantity, but it is seldom necessary to exceed .5%. Other combinations can be provided within the previously described ranges of ingredients, the active ingredients according to the invention being adjusted relative to each other and flour or sodium chloride and flour being added in an amount sufficient to serve their intended purposes.

The amounts of the particular enzyme composition employed will depend upon the activity of the composition. Thus, the composition employed in the following examples has an Ayre Anderson level of 9350 units per gram. Other compositions have different activities and will be used in amounts corresponding to their activities.

In the examples, the results of baking tests carried out according to the invention are shown and are compared with results obtained where no additives were present or where the several ingredients were employed alone or in other combinations. The bread was made by a typical sponge and dough method, and typical control doughs were made and were compared with doughs additionally containing one or more additives. A typical method of making bread by the sponge and dough method consists in preparing a sponge from the following ingredients:

360 parts by weight of spring wheat patent flour
12 parts of baker's yeast (active yeast)
1.25 parts of yeast food
Water The sponge is prepared by mixing and then fermenting at 80° F. The following ingredients are then added:

240 parts of winter wheat patent flour
18 parts of sugar
18 parts of powdered skim milk
24 parts of lard
12 parts of sodium chloride
Water This addition is referred to as the dough stage. In the examples and in the preferred operation of the invention, the composition of active substances is also added at this stage, desirably being placed on top of the flour. Alternatively, the composition or part of its ingredients may be added at the sponge stage to provide the desired incorporation thereof in the dough. Diastatic malt, additional enzyme preparations and additional dough drying ingredients are unnecessary and may interfere, and are, therefore excluded. The flours now being used permit a standard water absorption of 64% of the weight of the flour, the above quantities of water being adjusted accordingly. The invention provides increased water absorption of about 1.5%, so that 65.5% of water is incorporated.

After mixing the dough, it is fermented at 80° F., subdivided, placed in pans and retained at 95° F. and at a relative humidity of about 90% for 50 minutes. The dough is then baked at 425° F. for 30 minutes.

The following examples are furnished to assist in providing a complete understanding of the invention, but it is to be understood that the invention is not limited thereto nor to the specific compositions, proportions and procedures set forth therein, which are given only for purposes of illustration. In the examples, the percentages are by weight.

EXAMPLE 1

Bread doughs were prepared by the sponge and dough method and baked. A control dough was prepared, 64% water being used. Other doughs were prepared in the same manner but in addition, quantities of the special ingredients were incorporated in the dough, as indicated in Table I below, and 65.5% water was used. The breads were scored or rated after being out of the oven 24 hours, and the scores are listed in the table. Test A represents the control, tests B, C and D are doughs to which one of the special ingredients were added, tests E, F and G are doughs to which two of the special ingredients were added, and test H represents dough to which was added the composition of the invention including the diluents, flour and salt, in the proportions listed previously.

*Table I*

| No. | Loaf Vol. (10) | Loaf Shape (5) | Crust Color (10) | Crust Character (5) | Grain (10) | Crumb Color (10) | Texture (15) | Odor (15) | Flavor (20) | Total Score (100) |
|---|---|---|---|---|---|---|---|---|---|---|
| A. Control | 10.0 | 5.0 | 10.0 | 5.0 | 9.0 | 9.0 | 13.5 | 14.0 | 19.0 | 94.5 |
| B. 0.01% In. Yeast | 10.0 | 4.0 | 9.5 | 5.0 | 9.5 | 8.5 | 14.0 | 13.5 | 18.5 | 92.5 |
| C. 0.001% Cal. Perox | 10.0 | 4.0 | 10.0 | 5.0 | 9.5 | 9.0 | 14.0 | 13.0 | 18.0 | 92.5 |
| D. 0.0005% Enzyme [1] | 10.0 | 4.0 | 10.0 | 5.0 | 9.0 | 9.0 | 13.5 | 13.5 | 18.5 | 92.5 |
| E. .0005% Enz., 0.01% In. Yeast | 9.5 | 4.5 | 10.0 | 5.0 | 9.5 | 9.0 | 13.5 | 14.0 | 19.0 | 94.0 |
| F. 0.01% In. Yeast, 0.001% Cal. Per | 9.5 | 4.0 | 9.5 | 5.0 | 9.5 | 9.0 | 13.5 | 13.5 | 18.5 | 92.0 |
| G. 0.0005% Enz., 0.001% Cal. Per | 9.0 | 4.5 | 9.0 | 5.0 | 9.5 | 9.5 | 13.0 | 14.0 | 18.5 | 92.0 |
| H. .001% Cal. Per., .01% In. Yeast and .0005% Enz | 10.0 | 4.5 | 10.0 | 5.0 | 9.5 | 9.0 | 14.5 | 14.5 | 19.5 | 96.5 |

[1] Equivalent to 4.7 A. A. units.

Examination of the loaf characteristics and the total score showed that calcium peroxide detracted from flavor and odor, even in the extremely small quantity employed. The fungal enzyme was similar in effect. The yeast not only detracted from flavor and odor, but in this example, produced a dark crumb color.

The combinations of two of the ingredients at the same levels, in tests E, F and G, showed deleterious effects upon various loaf characteristics.

Test H according to the invention showed that the characteristics of flavor, odor, texture and grain were very substantially improved over those of the control and over those of the other tests.

EXAMPLE 2

Tests similar to those of Example 1 were carried out, and the results are shown in Table II. Test A is the control, the doughs of tests B, C and D additionally contained one of the active ingredients, and the doughs of tests E and F contained the new combination of ingredients. In test A the water absorption was 64%. In tests B to E the water absorption was 65.5%. In test F 65% water was added. In tests B to F, flour was included with the active additives, and in tests E and F, sodium chloride was also included, in the manner previously illustrated, the proportions being such that .12% by weight of the flour of the resulting composition was added at the dough stage to provide the quantities of ingredients listed in the table.

Table II

| No. | Loaf Vol. (10) | Loaf Shape (5) | Crust Color (10) | Crust Character (5) | Grain (10) | Crumb Color (10) | Texture (15) | Odor (15) | Flavor (20) | Total Score (100) |
|---|---|---|---|---|---|---|---|---|---|---|
| A. Control | 10.0 | 4.5 | 10.0 | 4.5 | 8.5 | 9.5 | 13.0 | 14.0 | 19.0 | 93.0 |
| B. .01% In. Yeast | 9.5 | 4.0 | 10.0 | 4.5 | 9.5 | 9.5 | 13.0 | 14.0 | 19.0 | 93.0 |
| C. .001% Cal. Perox | 9.5 | 4.5 | 10.0 | 4.5 | 9.5 | 9.5 | 13.0 | 13.0 | 17.5 | 91.0 |
| D. .0005% Enz | 10.0 | 4.5 | 10.0 | 4.5 | 8.5 | 9.5 | 13.0 | 13.0 | 17.5 | 90.5 |
| E. .001% Cal. Per., .01% In. Yeast and .0005% Enz | 9.5 | 4.5 | 10.0 | 4.5 | 9.5 | 10.0 | 14.5 | 14.5 | 19.5 | 96.5 |
| F. .001% Cal. Per., .01% In. Yeast and .0005% Enz | 9.5 | 4.5 | 10.0 | 4.5 | 8.5 | 9.5 | 14.0 | 14.5 | 19.5 | 94.5 |

The results showed that the individual ingredients do not produce the desired results alone. When the ingredients are incorporated together at the same levels, the drying effect, reducing mixing time, and improvement in water absorption are obtained. Texture, odor and flavor do not suffer as when the individual ingredients are used but are in fact superior. Tests E and F indicate that the improvement is greatest when water is incorporated up to the capacity of the dough.

EXAMPLE 3

Baking studies similar to those described in Example 1 were carried out. The mixing time was reduced, and the total scores of the breads prepared with the new composition were 96.5 as compared to 94.5 of the control. The new composition reduced the mixing time by 20%. Similar experiments using the individual ingredients showed considerably lower total bread scores than the control. The experiments were corroborated with tests made under manufacturing conditions in commercial bakeries.

There is thus provided by the invention new and improved compositions and methods in baking yeast-raised products. The disadvantages previously encountered are avoided while the desirable effects sought are obtained. At the same time, the combination acts synergistically to provide the improvements with much less of the active ingredients than had been considered efficacious heretofore. Operation in the dough stage is improved, water absorption is increased, and the characteristics of the bake products are excellent.

The invention is hereby claimed as follows:

1. A composition for incorporation with 100 grams of flour in the dough of a yeast-raised bake product to improve baking results comprising in relative amounts about .0005 to .01 gram of calcium peroxide, about .005 to .05 gram of brewer's inactive yeast, and about 1 to 50 Ayre Anderson units of a proteolytic enzyme.

2. A composition for incorporation with 100 grams of flour in the dough of a yeast-raised bake product to improve baking results comprising in relative amounts about .0005 to .01 gram of calcium peroxide, about .005 to .05 gram of brewer's inactive yeast, and about 1 to 50 Ayre Anderson units of a proteolytic fungal enzyme.

3. A composition for incorporation in the dough of a yeast-raised bake product in a proportion of about 0.12% to 0.5% by weight of the flour to improve baking results comprising in percentages by weight about .83% of calcium peroxide, about 8.3% of brewer's inactive yeast, the equivalent of about .42% of a proteolytic fungal enzyme having about 9350 Ayre Anderson units per gram, and flour.

4. A method for improving baking results in a yeast-raised bake product which comprises incorporating in the dough of the bake product in amounts per 100 grams of the flour about .0005 to .01 gram of calcium peroxide, about .005 to .05 gram of brewer's inactive yeast, and about 1 to 50 Ayre Anderson units of a proteolytic fungal enzyme.

5. A method for improving baking results in a yeast-raised bake product which comprises incorporating in the dough of the bake product in amounts per 100 grams of the flour about .001 to .0015 gram of calcium peroxide, about .01 to .015 gram of brewer's inactive yeast, and about 4.5 to 7.5 Ayre Anderson units of a proteolytic fungal enzyme.

6. A method for improving baking results in a yeast-raised bake product which comprises incorporating in the dough of the bake product in amounts per 100 grams of the flour about .0005 to .01 gram of calcium peroxide, about .005 to .05 gram of brewer's inactive yeast, and about 1 to 50 Ayre Anderson units of a proteolytic enzyme.

References Cited in the file of this patent

UNITED STATES PATENTS

| | | |
|---|---|---|
| 1,325,327 | Kohman et al. | Dec. 16, 1919 |
| 1,907,764 | Epstein et al. | May 9, 1933 |
| 2,114,694 | Wilhartz et al. | Apr. 19, 1938 |
| 2,153,445 | Willaman et al. | Apr. 4, 1939 |
| 2,262,138 | Frey et al. | Nov. 11, 1941 |

OTHER REFERENCES

"The Chemistry and Technology of Enzymes," 1949, by H. Tauber, published by John Wiley & Sons, Inc. (New York), pages 401–402 relied on.

"Federal Register," August 8, 1950, pages 5102 to 5112. (Pages 5104, 5110 and 5111 relied on.)